United States Patent [19]
Taylor et al.

[11] Patent Number: 5,423,360
[45] Date of Patent: Jun. 13, 1995

[54] APPARATUS FOR CENTERING A WORK-PIECE RELATIVE TO A CUTTING TOOL

[75] Inventors: Christopher L. Taylor, Dallas; Perry G. McDaniel, Midlothian, both of Tex.

[73] Assignee: Taylor Design Group, Inc., Dallas, Tex.

[21] Appl. No.: 225,190

[22] Filed: Apr. 8, 1994

[51] Int. Cl.⁶ ............................................. B27B 5/02
[52] U.S. Cl. ............................. 144/253 J; 33/640;
33/645; 33/628; 83/468.1; 83/468.2; 83/468.7;
144/253 R; 144/253 C; 144/253 F; 409/218
[58] Field of Search ................ 144/1 R, 253 R, 253 C,
144/253 F, 253 J, 286 D, 286 A; 409/218;
83/468.1, 468.2, 468.7; 33/628, 626, 638, 640,
641, 645

[56] References Cited

U.S. PATENT DOCUMENTS

| | | | |
|---|---|---|---|
| 1,947,885 | 2/1934 | Tautz | 144/253.5 |
| 2,409,921 | 10/1946 | Wolff | 33/641 |
| 4,793,604 | 12/1988 | Taylor | 269/303 |
| 5,063,983 | 11/1991 | Barry | 144/253.5 |
| 5,195,730 | 3/1993 | Taylor | 269/303 |
| 5,353,515 | 10/1994 | Alvis et al. | 33/640 |

Primary Examiner—W. Donald Bray
Attorney, Agent, or Firm—Workman, Nydegger & Seeley

[57] ABSTRACT

A centering apparatus intended for use with a woodworking device having a cutting tool and fence for positioning the center of a work-piece in exact alignment with the center of the cutting tool. The centering apparatus comprising an elongate member having a first end, a second end, parallel longitudinal sides and a center hole located at the center of the elongate member. A swiveling right angle bracket for engaging one of two opposing parallel surfaces of a work-piece is connected to the first end. Connected to the second end is a contact member for contacting a guiding fence. A cylindrical dowel pin for pivoting the centering apparatus about the center hole of the elongate member is aligned with the geometric center of the cutting tool with one end of the cylindrical dowel pin extending through the center hole of the elongate member and the other end positioned within the chuck of the cutting tool.

21 Claims, 5 Drawing Sheets

APPARATUS FOR CENTERING A WORK-PIECE RELATIVE TO A CUTTING TOOL

BACKGROUND

1. Field of the Invention

This invention relates generally to woodworking equipment and, in particular, to an apparatus for automatically positioning the center of a work-piece in exact alignment with the center of a cutting tool, such as a router bit or drill bit.

2. Background Art

In various fields of craftsmanship, there is the need for precision positioning of work-pieces so that they are positioned correctly for subsequent performance of procedures thereon; procedures such as shaping, cutting, boring, milling, and the like. In precision woodworking, it has been customary to employ guiding apparatus such as those disclosed in U.S. Pat. Nos. 4,793,604 and 5,195,730 granted to Christopher L. Taylor on Dec. 27, 1988 and Mar. 23, 1993, respectively. Those apparatus, known as INCRA ® Universal Precision Positioning Jigs, embody a number of features, including a positive interlocking saw-tooth rack construction that provide adjustment in discrete increments. Overall work-piece positioning accuracy and repeatability using this approach can be very high, and is limited only by the accuracy with which the positioning rack elements can be manufactured. The availability of this high level of accuracy make it possible for INCRA ® Positioning Jigs to perform certain woodworking operations which previously required special purpose jigs, fixtures, or other devices to achieve satisfactory results.

One of many such commonly performed operations is the formation of woodworking "joints" such as box joints and dovetail joints (usually with a rotating router bit in a router table) which are used to join two boards securely together in a close-fitting interlocking relationship, most often at right angles to each other. Such a precise fit results in a joint that is not only suitably strong, but also one that is visually appealing. Another requirement for a visually appealing joint is that the cuts forming the joint are located symmetrically about the ends of the two boards which are being joined together. Such symmetry also insures that both the top and bottom edges of the two boards will be flush with each other when the final fit is achieved.

The attainment of symmetry in woodworking joints requires an initial setup procedure commonly known as "centering." A work-piece is properly centered when the guiding apparatus (such as the INCRA ® Positioning Jig) is located relative to the cutting tool in such a manner that when one edge of the work-piece to be centered is abutted against the guiding apparatus, the center of said work-piece will be aligned with the center of the cutting tool (such as a router bit or drill bit).

The procedure for establishing this initial centered relationship between work-piece, cutting tool, and guiding apparatus has heretofore been carried out manually, normally requiring one or more stages of "trial-and-error" testing. Not only is such an approach complicated and time consuming, but it is also wasteful of wood or other work-piece materials.

From the foregoing, it will be appreciated that what is needed in the art is an apparatus for centering a work-piece, which provides simple procedures for accurate, automatic centering for a wide range of work-piece widths.

BRIEF SUMMARY AND OBJECTS OF THE INVENTION

It is, therefore, a principal object of the present invention to provide an apparatus for centering a work-piece relative to a principal work-piece guiding surface and the bit or cutting tool used to form cuts in a work-piece.

It is another object of the invention to provide an apparatus for accurately centering a work-piece relative to a cutting tool.

It is a further object of the invention to provide an apparatus for quickly and easily centering a work-piece relative to a cutting tool.

It is still another object of the invention to provide an apparatus for automatically centering a work-piece relative to a cutting tool.

It is yet another object of the invention to provide an apparatus for centering work-pieces with a wide range of widths.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein, a centering apparatus is provided for precisely and automatically positioning the center of a work-piece in exact alignment with the center of a cutting tool. The centering apparatus is comprised of an elongate member having a first end, a second end, parallel longitudinal sides and a center hole located at the center of the elongate member.

A means for engaging one of two opposing parallel surfaces of a work-piece is connected to the first end. Connected to the second end is a means for contacting a guiding fence. A means for pivoting the centering apparatus about the center hole of the elongate member is aligned with the geometric center of the cutting tool, with one end of the pivoting means extending through the center hole of the elongate member and the other end positioned within the chuck of a motorized power tool.

A work-piece to be centered, having two opposing parallel surfaces, is first placed in the centering apparatus. A guiding apparatus, such as the INCRA ® Positioning Jig, is then moved toward the work-piece, causing its principal guiding member, the fence, to simultaneously contact one of the two opposing parallel surfaces of the work-piece and the contacting means of the centering apparatus. As the fence is advanced, the centering apparatus is caused to pivot around the pivoting means until the engaging means engages the parallel work-piece surface opposite the parallel work-piece surface contacting the fence, thus preventing further forward motion of the fence, and also preventing further pivoting motion of the centering apparatus about the pivoting means. When this configuration is reached, the work-piece is held firmly in place between the fence and the engaging means. Using conventional clamping or fastening means, the guiding apparatus is subsequently affixed to the working surface of the router table or drill press, thus establishing an initial fence position such that when one of the two opposing parallel surface of the work-piece is abutted against the fence, the center of the work-piece is positioned in exact alignment with the center of the cutting tool.

BRIEF DESCRIPTION OF THE DRAWINGS

In order to more fully understand the manner in which the above-recited and other advantages and objects of the invention are obtained, a more particular description of the invention will be rendered by reference to specific embodiments thereof, which are illustrated in the appended drawings. Understanding that these drawings depict only typical embodiments of the invention and, therefore, are not to be considered limiting of its scope, the invention in its presently understood best mode for making and using tile same will be described with additional specificity and detail through the use of the accompanying drawings, in which.

DETAILED DESCRIPTION OF THE PREFERRED EMBODIMENTS

Reference is now made to the drawings in which like parts are referenced with like numerals throughout.

Referring to FIGS. 1-5, a centering apparatus 10 according to the present invention includes elongate member 12 with respective first and second ends 14 and 16. The elongate member 12 has substantially parallel longitudinal sides 18a and 18b. A center hole 20 is located at the center of the elongate member 12.

Figure 1:
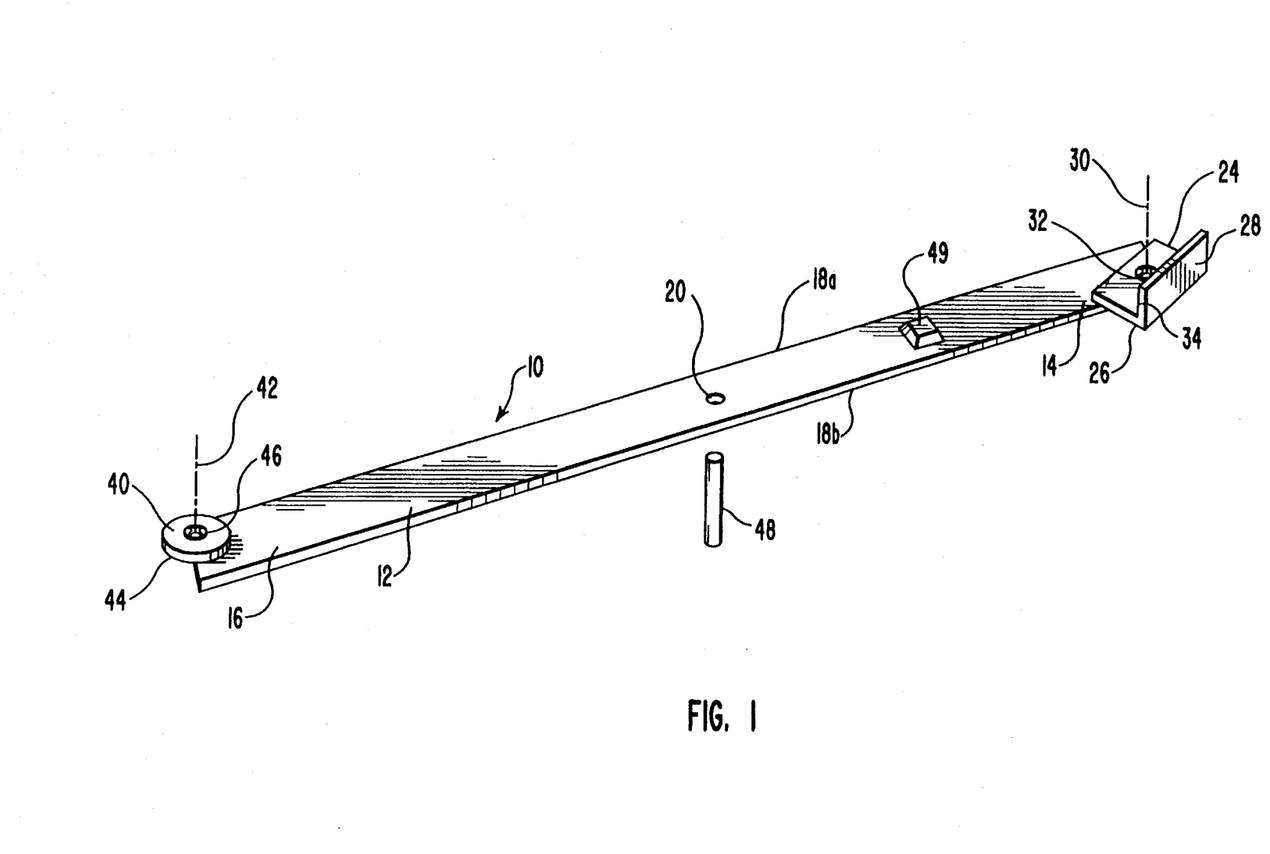
FIG. 1 is a perspective view showing the centering apparatus in accordance with the invention.

Connected to the first end 14 of the elongate member 12 is a swiveling right angle bracket 24. The swiveling right angle bracket 24 has a base 26 orthogonal to a back 28. The swiveling right angle bracket has a center of rotation 30 located in the base 26. The center of rotation is concentric with a connecting rivet 32 which connects the swiveling right angle bracket 24 with the first end of the elongate member 12 and allows the swiveling right angle bracket 24 to freely rotate.

The back 28 of the swiveling right angle bracket 24 has an engaging surface 34 which is relatively flat to permit the engaging surface 34 to receive one of two opposing parallel surfaces of a work-piece in an abutting relationship. The top of the connecting rivet 32 also supports the bottom of a work-piece while engaged by the swiveling right angle bracket 24. The swiveling right angle bracket 24 is an example of a means for engaging a parallel surface of a work-piece. It will be appreciated that other structures can also be utilized as a means for engaging a parallel surface of a work-piece.

Connected to the second end of the elongate member 12 is a contact member 40 having a center 42 and a circular perimeter 44. The center is concentric with a connecting pin 46 which connects the contact member 40 to the second end 16. The radius between the center 42 and the circular perimeter 44 is equal to the length between the center of rotation 30 of the swiveling right angle bracket 24 and the engaging surface 34 of the back 28 of the swiveling right angle bracket 24 within the same plane as the base 26. The contact member 40 is an example of a means for contacting a fence. It will be appreciated that other structures can also be utilized as a means for contacting a fence.

A cylindrical dowel pin 48 is inserted through the center hole 20 of the elongate member 12. The inserted cylindrical dowel pin 48 acts as a spindle and enables the centering apparatus 10 to pivot about the center hole 20 of the elongate member 12. The cylindrical dowel pin 48 is an example of a means for pivoting the elongate member 32 about the center hole 20. It will be appreciated that other structures can also be utilized as a means for pivoting the elongate member 12 about the center hole 20.

A work-piece support pad 49 is shown affixed to the elongate member. The work-piece support pad 49 raises a portion of the work-piece to the height of the top of the connecting rivet 32 of the swiveling right angle bracket 24 and maintains the work-piece in a level position.

Figure 2:
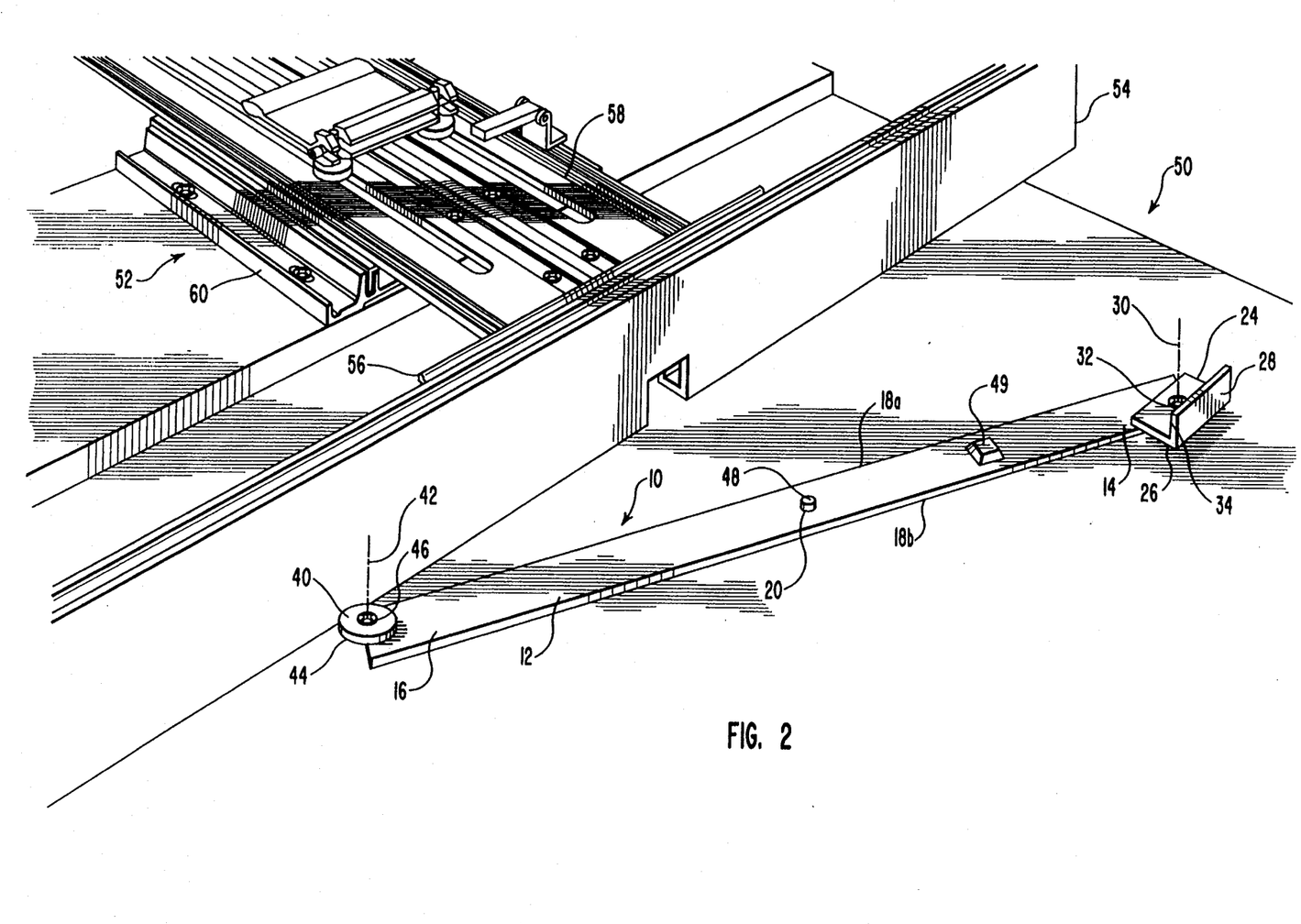
FIG. 2 is a perspective view showing a guiding apparatus and a conventional router table fitted with the centering apparatus in accordance with the invention.

FIG. 2 shows the centering apparatus on a conventional router table 50 equipped with a guiding apparatus 52. One end of the cylindrical dowel pin 48 extends through the center hole 20 of the elongate member 12 while the other end is positioned within the chuck of a router (not shown). Removal of the cutting tool, such as a router bit, permits the cylindrical dowel pin 48 to be inserted into and clamped into place in the chuck of the router such that the dowel pin 48 is aligned with the geometric center of the cutting tool.

A fence 54 is shown in place for acting as a guide for work-pieces as the work-pieces are passed over a router bit. Fence 54 may either be an ordinary piece of wood, such as plywood, or a specially designed member having channels running longitudinally and which are adapted for the connection of quick release members which may optionally be attached to fence mounting bracket 56. An example of such a specially constructed member is the INCRA ® fence system manufactured and sold by the Taylor Design Group, Inc. of Dallas, Tex. In addition to fence mounting bracket 56 the guiding apparatus 52 includes principal top portion 58 and base portion 60 which are adapted for relative movement therebetween.

Figure 3:
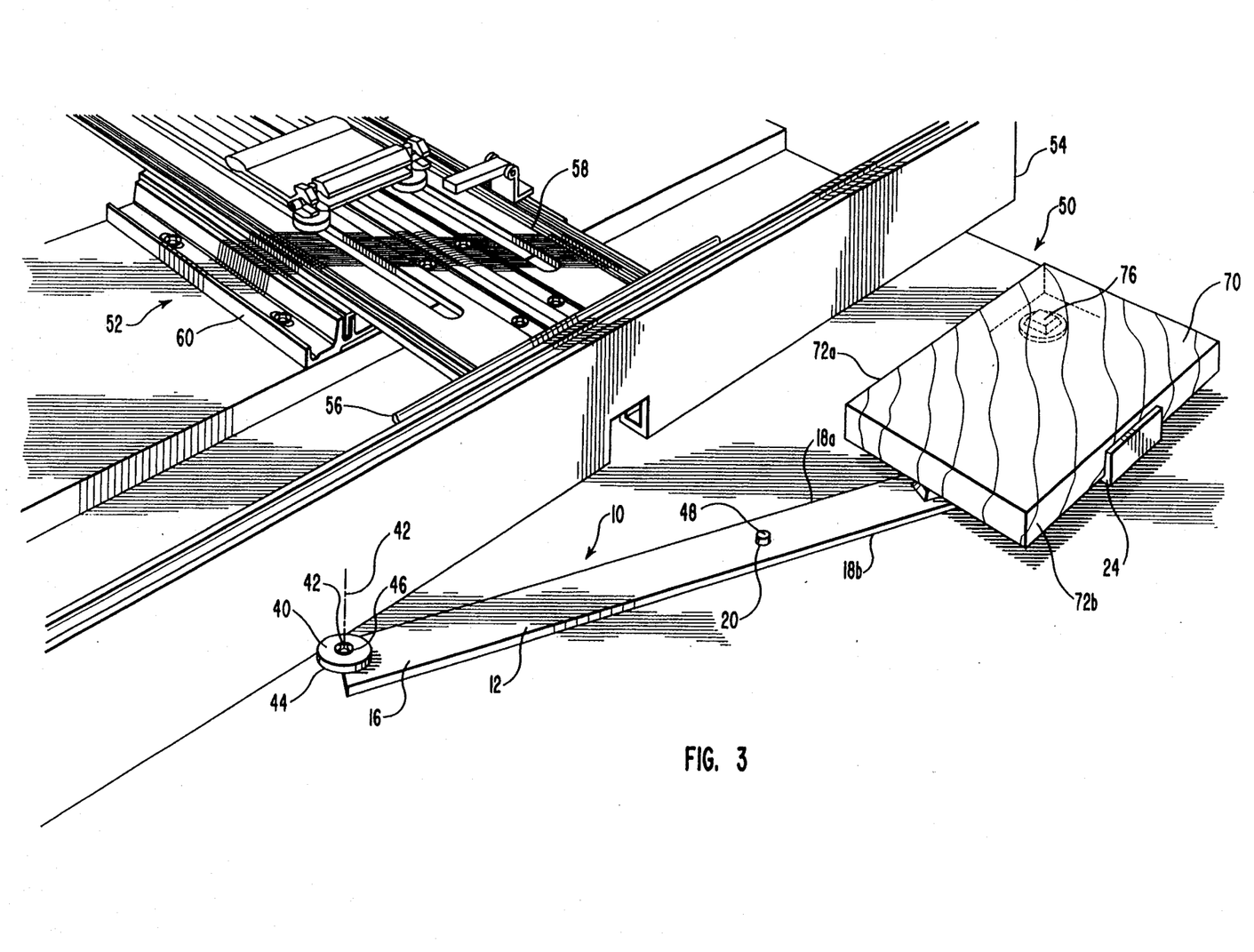
FIG. 3 is a perspective view showing a work-piece on the centering apparatus in accordance with the invention after the contacting means has contacted the fence of a guiding apparatus.

FIG. 3 shows a work-piece 70 having at least two opposing parallel surfaces 72a and 72b placed on the centering apparatus 10 after the contact member has contacted the fence 54 of a guiding apparatus 52 and before the work-piece 70 is centered. FIG. 3 also shows an unattached support pad 76 which can be manually placed below the work-piece 70 to assist in maintaining the work-piece in a level position at the height of the top of the connecting rivet of the swiveling right angle bracket 24.

Figure 4:
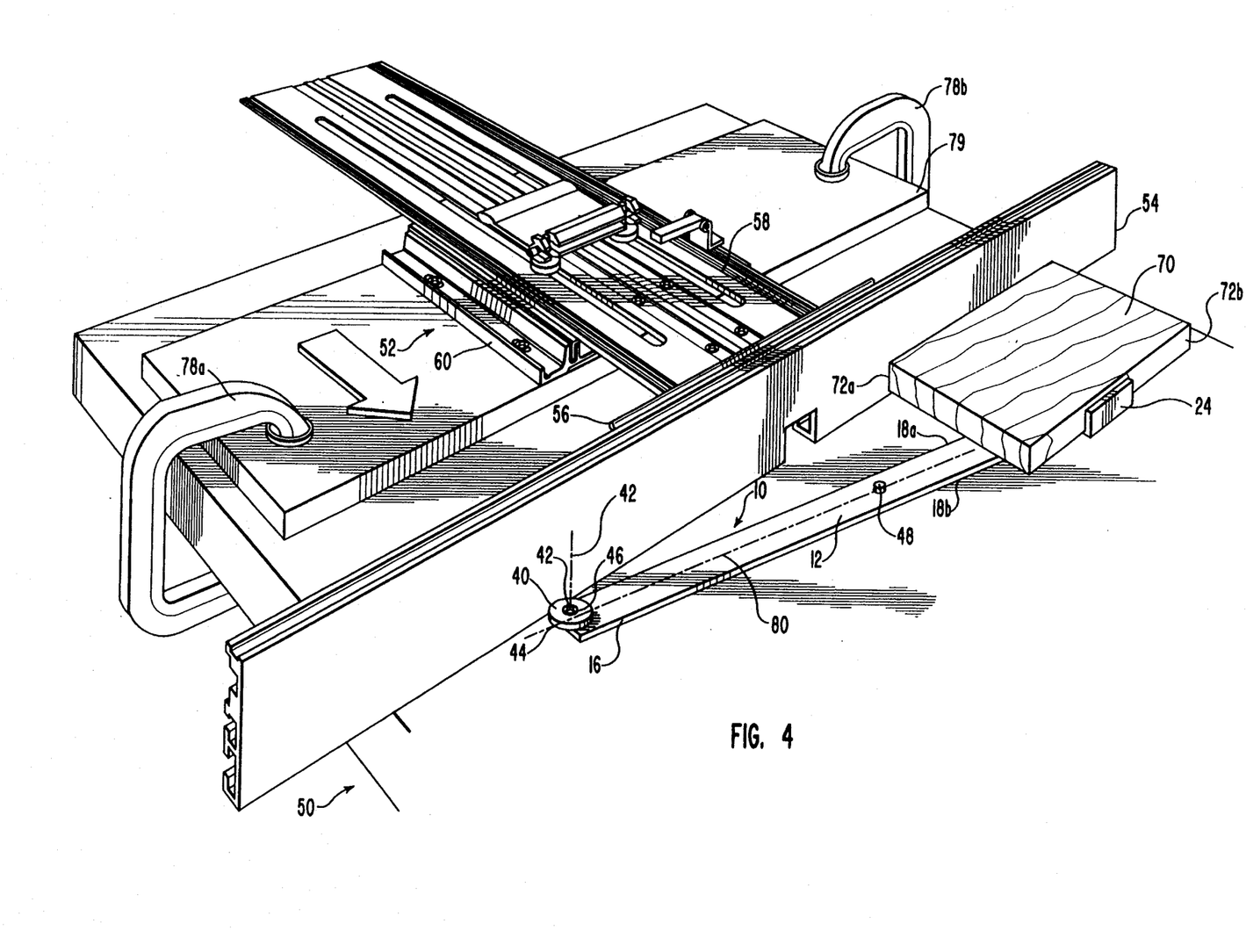
FIG. 4 is a perspective view showing a work-piece on the centering apparatus in accordance with the invention after the work-piece is centered.

To center the work-piece 70, guiding apparatus 52 is moved toward the work-piece 70, causing its principal guiding member, fence 54, to contact the perimeter 44 of the contact member 40 as shown in FIG. 3. Advancing fence 54 causes the centering apparatus 10 to pivot around the cylindrical dowel pin 48 until the parallel work-piece surface 72a contacts fence 54. As the centering apparatus 10 pivots, the work-piece 70 is urged into and retained in a centered position relative to the cutting tool when contact is maintained between the swiveling right angle bracket 24 and one of the opposing parallel surfaces 72b of the work-piece 70 and between contact member 40 and fence 54 while the parallel work-piece surface 72a contacts fence 54 as shown in FIG. 4. This configuration prevents further forward motion of fence 54 and further pivoting motion of the centering apparatus 10 about the cylindrical dowel pin 48 as the work-piece 70 is held firmly in place between the fence 54 and the swiveling right angle bracket 24.

Using conventional clamping or fastening means, such as the "C" clamps 78a and 78b mounted on an intermediate mounting board 79, the guiding apparatus 52 is subsequently affixed to the working surface of the router table 50 or drill press, thus establishing an initial fence position such that when one of the two opposing parallel surfaces of the work-piece is abutted against fence 54, the center of the work-piece 70 is positioned in exact alignment with the center of the cutting tool.

Figure 5:
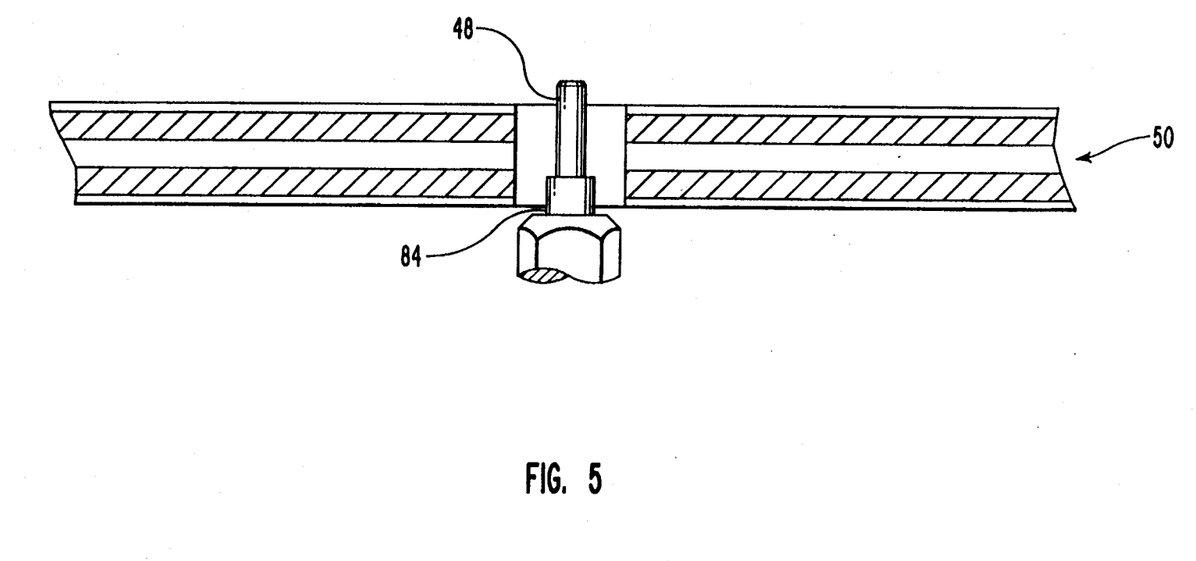
FIG. 5 is a cut away view showing a pivoting means positioned within a chuck and extending through a table.

FIG. 5 shows the cylindrical dowel pin 48 positioned within the chuck of a motorized power tool after the cutting tool or bit has been removed. The cylindrical dowel pin is positioned within the chuck 84 such that one end of the cylindrical dowel pin extends beyond the table 50 to be inserted into the center hole 20 of the elongate member 12.

In the preferred embodiment of the present invention as shown in FIGS. 1-5, the center of rotation 30 of the swiveling right angle bracket 24 and the center 42 of the contact member 40 are located offset from the center longitudinal axis 80 of the elongate member 12. In another embodiment of the present invention, the center of rotation 30 of the swiveling right angle bracket 24 and the center 42 of the contact member 40 are located on the center longitudinal axis 80 of the elongate member 12. In yet another embodiment of the present invention, the contact member 40 and the elongate member 12 are integral, the contact member 40 having a center 42 located offset or on the center longitudinal axis 80 of the elongate member 12. In all of the described embodiments, the center of rotation 30 of the swiveling right angle bracket 24 and the center 42 of the contact member 40 are located an equal distance normal to the nearest parallel longitudinal side of the elongate member 12. It will be apparent to one skilled in the art that the center of rotation 30 and the center 42 can be located anywhere on the elongate member as long as the center of rotation 30 and the center 42 are located an equal distance from the center hole 20 and are collinear with the center hole 20.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Patent is:

1. A centering apparatus intended for use with a woodworking device having a cutting tool and a fence for positioning a work-piece, having at least two opposing parallel surfaces, relative to the cutting tool, the centering apparatus comprising:
    (a) an elongate member having a first end, a second end and a center hole;
    (b) means, connected to the first end of the elongate member, for engaging one of said opposing parallel surfaces of the work-piece;
    (c) means, connected to the second end of the elongate member, for contacting the fence; and
    (d) means, aligned with the geometric center of the cutting tool, for pivoting the centering apparatus about the center hole of the elongate member, whereby the work-piece is urged into and retained in a centered position relative to the cutting tool when contact is maintained between the engaging means and one of said opposing parallel surfaces of the work-piece and the contacting means is aligned with the other of said opposing parallel surfaces of the work-piece.

2. A centering apparatus as defined in claim 1, wherein the pivoting means is a cylindrical dowel pin.

3. A centering apparatus as defined in claim 1, wherein the contacting means is a contact member.

4. A centering apparatus as defined in claim 1, wherein the contacting means and the second end of the elongate member are integral.

5. A centering apparatus as defined in claim 3, wherein the contact member and the second end of the elongate member are integral.

6. A centering apparatus as defined in claim 1, wherein the engaging means is a swiveling right angle bracket.

7. A centering apparatus as defined in claim 1, wherein the engaging means has a base orthogonal to a back, the engaging means having a center of rotation located in the base, the back having an engaging surface, and wherein the contacting means has a center and a circular perimeter, a radius between the center and the circular perimeter being equal to the length between the center of rotation of the engaging means and the engaging surface of the back of the engaging means within the same plane as the base.

8. A centering apparatus as defined in claim 1, wherein the engaging means has a center of rotation, wherein the contacting means has a center, the center of rotation of the engaging means and the center of the contacting means being located an equal distance from the center hole and being collinear with the center hole.

9. A centering apparatus as defined in claim 1, wherein the elongate member has parallel longitudinal sides, wherein the engaging means has a center of rotation, wherein the contacting means has a center, the center of rotation of the engaging means and the center of the contacting means being located an equal distance normal to the nearest parallel longitudinal side of the elongate member.

10. A centering apparatus as defined in claim 1, further comprising:
    (a) at least one work-piece support pad affixed to the elongate member.

11. A centering apparatus intended for use with a woodworking device having a cutting tool and a fence for positioning a work-piece, having at least two opposing parallel surfaces, relative to the cutting tool, the centering apparatus comprising:
    (a) an elongate member having a first end, a second end and a center hole;
    (b) a swiveling right angle bracket, connected to the first end of the elongate member, for engaging one of said opposing parallel surfaces of the work-piece;

(c) a contact member, connected to the second end of the elongate member, for contacting the fence; and (d) a cylindrical dowel pin, aligned with the geometric center of the cutting tool, for pivoting the centering apparatus about the center hole of the elongate member, whereby the work-piece is urged into and retained in a centered position relative to the cutting tool when contact is maintained between the swiveling right angle bracket and one of said opposing parallel surfaces of the work-piece and the contacting means is aligned with the other of said opposing parallel surfaces of the work-piece.

12. A centering apparatus as defined in claim 10, wherein the contact member and the second end of the elongate member are integral.

13. A centering apparatus as defined in claim 10, wherein the swiveling right angle bracket has a base orthogonal to a back, the swiveling right angle bracket having a center of rotation located in the base, the back having an engaging surface, and wherein the contact member has a center and a circular perimeter, a radius between the center and the circular perimeter being equal to the length between the center of rotation of the swiveling right angle bracket and the engaging surface of the back of the swiveling right angle bracket within the same plane as the base.

14. A centering apparatus as defined in claim 10, wherein the swiveling right angle bracket has a center of rotation, wherein the contact member has a center, the center of rotation of the swiveling right angle bracket and the center of the contact member being located an equal distance from the center hole and being collinear with the center hole.

15. A centering apparatus as defined in claim 10, wherein the elongate member has a center longitudinal axis, wherein the swiveling right angle bracket has a center of rotation, wherein the contact member has a center, the center of rotation of the swiveling right angle bracket and the center of the contact member being located an equal distance normal to the center longitudinal axis of the elongate member.

16. A centering apparatus as defined in claim 10, further comprising:

(a) at least one work-piece support pad affixed to the elongate member.

17. A centering apparatus intended for use with a woodworking device having a cutting tool and a fence for positioning a work-piece, having at least two opposing parallel surfaces, relative to the cutting tool, the centering apparatus comprising:

(a) an elongate member having a first end, a second end and a center hole located at the center of the elongate member;

(b) a swiveling right angle bracket, connected to the first end of the elongate member, for engaging one of said opposing parallel surfaces of the work-piece, the swiveling right angle bracket having a base orthogonal to a back, the swiveling right angle bracket having a center of rotation located in the base, the back having an engaging surface;

(c) a contact member, connected to the second end of the elongate member, for contacting the fence, the contact member having a center and a circular perimeter, a radius between the center and the circular perimeter being equal to the length between the center of rotation of the swiveling right angle bracket and the engaging surface of the back of the swiveling right angle bracket within the same plane as the base.

(d) a cylindrical dowel pin for pivoting the centering apparatus about the center hole in the elongate member, the cylindrical dowel pin aligned with the geometric center of the cutting tool, for pivoting the elongate member about the center hole, whereby the work-piece is urged into and retained in a centered position relative to the cutting tool when contact is maintained between the engaging means and one of said opposing parallel surfaces of the work-piece and the contacting means is aligned with the other of said opposing parallel surfaces of the work-piece.

18. A centering apparatus as defined in claim 15, wherein the contact member and the second end of the elongate member are integral.

19. A centering apparatus as defined in claim 15, wherein the center of rotation of the swiveling right angle bracket and the center of the contact member are located an equal distance from the center hole and being collinear with the center hole.

20. A centering apparatus as defined in claim 15, wherein the elongate member has a center longitudinal axis, and wherein the center of rotation of the swiveling right angle bracket and the center of the contact member are located an equal distance normal to the center longitudinal axis of the elongate member.

21. A centering apparatus as defined in claim 15, further comprising:

(a) at least one work-piece support pad affixed to the elongate member.

* * * * *

UNITED STATES PATENT AND TRADEMARK OFFICE
CERTIFICATE OF CORRECTION

PATENT NO.　：　5,423,360
DATED　　　：　June 13, 1995
INVENTOR(S)：　Christopher L. Taylor and Perry G. McDaniel It is certified that error appears in the above-indentified patent and that said Letters Patent is hereby corrected as shown below:

Column 1, line 31, change "make it possible" to --makes it possible--.

Column 3, line 1, change "surface" to --surfaces--.

Column 3, line 15, change "tile same" to --the same--.

Column 5, line 48, change "collinear" to --colinear--.

Column 8, line 21, change "base." to --base; and--.

Signed and Sealed this

Twenty-fifth Day of June, 1996

BRUCE LEHMAN

Attest:

*Attesting Officer*　　　*Commissioner of Patents and Trademarks*